(12) United States Patent
Nakamura et al.

(10) Patent No.: US 8,353,985 B2
(45) Date of Patent: Jan. 15, 2013

(54) PROCESS FOR PRODUCING COLLOIDAL CRYSTALS IMMOBILIZED WITH A POLYMER AND COLLOIDAL CRYSTALS IMMOBILIZED WITH A POLYMER

(75) Inventors: Hiroshi Nakamura, Seto (JP); Masahiko Ishii, Toyota (JP)

(73) Assignee: Kabushiki Kaisha Toyota Chuo Kenkyusho, Aichi (JP)

(*) Notice: Subject to any disclaimer, the term of this patent is extended or adjusted under 35 U.S.C. 154(b) by 1244 days.

(21) Appl. No.: 12/155,505

(22) Filed: Jun. 5, 2008

(65) Prior Publication Data

US 2008/0305968 A1    Dec. 11, 2008

(30) Foreign Application Priority Data

Jun. 6, 2007    (JP) ................................. 2007-150016

(51) Int. Cl.
*C30B 29/54* (2006.01)
(52) U.S. Cl. ................. 117/68; 117/69; 117/70; 117/72
(58) Field of Classification Search .................... 117/68, 117/69, 70, 72
See application file for complete search history.

(56) References Cited

U.S. PATENT DOCUMENTS

| | | | | |
|---|---|---|---|---|
| 7,364,673 | B2 * | 4/2008 | Arsenault et al. | 252/586 |
| 7,826,131 | B2 * | 11/2010 | Arsenault et al. | 359/318 |
| 8,133,923 | B2 * | 3/2012 | Jiang | 516/99 |
| 2004/0131799 | A1 * | 7/2004 | Arsenault et al. | 428/1.26 |
| 2005/0095417 | A1 * | 5/2005 | Jiang | 428/304.4 |
| 2008/0224103 | A1 * | 9/2008 | Arsenault et al. | 252/519.2 |

FOREIGN PATENT DOCUMENTS

| | | |
|---|---|---|
| JP | A-6-100432 | 4/1994 |
| JP | A-11-319539 | 11/1999 |
| JP | A-2002-28471 | 1/2002 |
| JP | A-2002-128600 | 5/2002 |
| JP | A-2005-325173 | 11/2005 |
| JP | A-2005-338243 | 12/2005 |
| JP | A-2007-29775 | 2/2007 |
| JP | A-2007-510183 | 4/2007 |
| JP | A-2008-7666 | 1/2008 |
| WO | WO 2005/045478 A1 | 5/2005 |

* cited by examiner

*Primary Examiner* — Bob M Kunemund
(74) *Attorney, Agent, or Firm* — Oliff & Berridge, PLC (57) ABSTRACT

A process for producing colloidal crystals immobilized with a polymer, comprising the steps of:
  preparing a monomer-dispersion in which colloidal crystals having a three-dimensionally ordered array state are formed by adding, to a monomer-containing liquid containing at least one kind of monomers, colloidal particles having an average particle size in a range from 0.01 μm to 10 μm and a degree of monodispersity expressed by a following equation (1) of 20% or below,

[Degree of monodispersity (unit: %)]=([Standard deviation of particle size]/[Average particle size])×100    (1)

and then by dispersing the colloidal particles so as to arrange the colloidal particles in a three-dimensionally ordered array state at which a reflection spectrum thereof exhibits a reflection peak; and
  obtaining the colloidal crystals immobilized with a polymer by polymerizing the monomers in the monomer-dispersion.

11 Claims, 3 Drawing Sheets

PROCESS FOR PRODUCING COLLOIDAL CRYSTALS IMMOBILIZED WITH A POLYMER AND COLLOIDAL CRYSTALS IMMOBILIZED WITH A POLYMER

BACKGROUND OF THE INVENTION

1. Field of the Invention

The present invention relates to a process for producing colloidal crystals immobilized with a polymer and colloidal crystals immobilized with a polymer.

2. Related Background Art

It is known that colloidal crystals having an ordered structure composed of colloidal particles reflects a light having a wavelength corresponding to the lattice constant of the colloidal crystals due to Bragg diffraction. For example, colloidal crystals composed of three-dimensionally ordered submicron colloidal particles reflects a light having a wavelength in a range from ultraviolet light and visible light to infrared light It is known that, when such a colloidal crystal reflects visible light, so-called structural color, such as iridescence (iris color), can be observed. Due to the characteristics, such colloidal crystals are expected to be used in various applications, such as a color material exhibiting structural color, an optical filter impermeable to a light having a certain wavelength, a mirror reflecting a certain light, a photonic crystal, an optical switch, and an optical sensor. Thus, various colloidal crystals and the process for producing those have been investigated.

For example, Japanese Unexamined Patent Application Publication No. Hei 6-100432 (JP 6-100432 A) discloses that colloidal crystals can be obtained by removing contaminating ions (cations and anions) from a particle dispersion having water or a water-organic solvent as a dispersed medium in order to highly deionize the solution. The Japanese Unexamined Patent Application Publication No. Hei 11-319539 (JP 11-319539 A) discloses a process for producing colloidal crystals. In the process, a weak electrolyte, which changes its dissociation degree in the liquid medium according to temperature variation, is added to a colloidal dispersion system in which colloidal particles each charged on the surface are dispersed in the liquid medium, and the colloidal dispersion system is externally heated or cooled so that the colloidal particles are arranged. Moreover, Japanese Unexamined Patent Application Publication No. 2002-28471 (JP 2002-28471 A) discloses a process for producing colloidal crystals. In the process, shear flow is applied to a monodispersed particle suspension in a colloidal crystal state to cause the monodispersed particle suspension to flow, in a space between two smooth substrate surfaces facing in parallel with each other, in a single axis direction parallel to the substrate surfaces. Thereafter, the monodispersed particle suspension is kept stationary to allow colloidal crystals to form. Japanese Unexamined Patent Application Publication No. 2002-128600 (JP 2002-128600 A) also discloses a process for producing colloidal crystals in which colloidal crystals are formed from crystals appeared in a colloidal suspension by applying, to the crystals, oscillation having an acceleration in a range from 0.1 G to 10 G and/or stress oscillation of 20 Pa or higher to allow the crystals to grow to a certain size. Furthermore, International Publication No. WO2005/045478 (WO 2005-045478 A) also discloses a process for producing colloidal crystals in which particles are added to monomer comprising ethoxylated trimethylolpropane triacrylate (ETPTA), and then the resultant mixture is spin-coated and immobilized to obtain the colloidal crystals.

However, it is difficult to control the structure (the lattice constant, the crystal type) of the colloidal crystals obtained by using the a process for producing colloidal crystals disclosed in JP 6-100432 A, JP 11-319539 A, JP 2002-28471 A, and JP 2002-128600 A. For example, the colloidal crystals obtained as described above essentially need to be immobilized in order for them to be used in practical application as various materials, such as a color material exhibiting structural color, an optical filter, a mirror, and a photonic crystal. However, when the colloidal crystals are immobilized after drying, the crystal structure of those is turned into a closed packing structure; thus, in the process, it was not able to control so that the structure of such colloidal crystals may turn into another structure. For this reason, it was difficult to use the conventional immobilized colloidal crystals described in JP 6-100432 A, JP 11-319539 A, JP 2002-28471 A, and JP 2002-128600 A in practical application such as optical materials. Meanwhile, there is another immobilization method in which colloidal crystals formed in a liquid are immobilized by a polymer gel to obtain a colloidal crystal gel. A problem involved in such a method is that the colloidal crystals are destroyed or a crystal structure is distorted and changed due to evaporation of a solvent in the process of immobilization. As for the conventional process for producing colloidal crystal described in WO 2005-045478 A, colloidal crystals formed in a liquid are directly immobilized with polymers. In the process, although colloidal crystals can be immobilized in the state of including no solvent (not in a gel), it is considered to be necessary to go through a spin-coating process in order to form an ordered array of the colloidal particles. Accordingly, it is difficult to apply the process for various purposes.

SUMMARY OF THE INVENTION

The present invention has been accomplished in view of the above-described problems involved in the prior art. An object of the present invention is to provide a process for producing colloidal crystals immobilized with a polymer by which colloidal crystals can be immobilized while the array structure of colloidal particles formed in a liquid is sufficiently maintained, and by which the crystal structure (the lattice constant, the crystal type and the like) of the colloidal crystal can be easily controlled. Furthermore, an object of the present invention is to provide colloidal crystals immobilized with a polymer obtained by adopting the process.

The present inventors have diligently conducted studies in order to accomplish the above object. As the result, they have found the fact that colloidal crystals can be immobilized while the array structure of colloidal particles formed in a liquid is sufficiently maintained, and that the crystal structure (the lattice constant, the crystal type and the like) of the colloidal crystal can be easily controlled, by performing as follows. Firstly, a monomer-dispersion including colloidal crystals having a three-dimensionally ordered array state is prepared. The colloidal crystals in the monomer-dispersion are formed by adding, to a monomer-containing liquid containing at least one kind of monomers, colloidal particles having an average particle size in a range from 0.01 μm to 10 μm and a degree of monodispersity of 20% or below, and then by dispersing the colloidal particles so as to arrange the colloidal particles in the three-dimensionally ordered array state at which a reflection spectrum thereof exhibits a reflection peak. Then, the monomers in the monomer-dispersion are polymerized. In this way, the present invention has been completed.

To be more specific, the process for producing colloidal crystals immobilized with a polymer of the present invention is a process comprising the step of:

preparing a monomer-dispersion in which colloidal crystals having a three-dimensionally ordered array state are formed by adding, to a monomer-containing liquid containing at least one kind of monomers, colloidal particles having an average particle size in a range from 0.01 µm to 10 µm and a degree of monodispersity expressed by a following equation (1) of 20% or below, $$[\text{Degree of monodispersity (unit: \%)}]=([\text{Standard deviation of particle size}]/[\text{Average particle size}])\times 100 \quad (1)$$

and then by dispersing the colloidal particles so as to arrange the colloidal particles in a three-dimensionally ordered array state at which a reflection spectrum thereof exhibits a reflection peak; and obtaining the colloidal crystals immobilized with a polymer by polymerizing the monomers in the monomer-dispersion.

In the process for producing colloidal crystals immobilized with a polymer of the present invention, it is preferable that the degree of monodispersity of the colloidal particles be 10% or below.

In the process for producing colloidal crystals immobilized with a polymer of the present invention, it is preferable that a viscosity of the monomer-containing liquid be in a range from 5 mPa·s to 50 mPa·s.

In the process for producing colloidal crystals immobilized with a polymer of the present invention, it is preferable that a content of the colloidal particles in the monomer-dispersion be in a range from 5 vol % to 50 vol %, and more preferably in a range from 10 vol % to 40 vol %.

Furthermore, it is preferable that the monomers according to the present invention be hydrophilic monomers each containing a nonionic hydrophilic group, and more preferably at least one kind of hydrophilic monomers selected from the group consisting of: polyethylene glycol(meta)acrylate; polyethylene glycol di(meta)acrylate; polyethylene glycol tri(meta)acrylate; polypropylene glycol(meta)acrylate; polypropylene glycol di(meta)acrylate; and polypropylene glycol tri(meta)acrylate.

As for the colloidal particles of the present invention, it is preferable that the particles are particles each made of any one selected from the group consisting of silica, polystyrene or methyl polymethacrylate.

In the process for producing colloidal crystals immobilized with a polymer of the present invention, it is preferable that the average particle size of the colloidal particles be in a range from 0.05 µm to 1.0 µm.

In the process for producing colloidal crystals immobilized with a polymer of the present invention, it is preferable that, in the step for preparing the monomer-dispersion, the colloidal particles are dispersed in the monomer-containing liquid by applying ultrasound having a frequency in a range from 20 kHz to 200 kHz for 0.5 hours to 24 hours.

The colloidal crystals immobilized with a polymer of the present invention are obtained by adopting the process for producing colloidal crystals immobilized with a polymer of the present invention.

The reason why the process for producing colloidal crystals immobilized with a polymer of the present invention allows the above objects to be accomplished is not completely clear. However, the present inventors estimate as follows. Specifically, in the present invention, highly monodispersed colloidal particles (having highly uniform particle sizes) having a sufficiently low degree of monodispersity, as described above, are added to a monomer-containing liquid. Accordingly, in the step of dispersing the colloidal particles in the monomer-containing liquid, by dispersing the colloidal particles uniformly so that all the particles can be separated into individual particles, interactions functions uniformly among particles. Due to such interactions among particles, a three-dimensionally ordered array structure can be easily formed. Furthermore, in the present invention, a monomer-dispersion in which the colloidal crystals are formed is obtained, for example, by adopting a preferable method of applying ultrasound so as to disperse colloidal particles in a three-dimensionally ordered array state at which the reflection spectrum thereof exhibits a reflection peak. Therefore, the monomer-dispersion thus obtained can be easily immobilized on various substrates by, for example, being applied or injected thereto. Thus, the present invention is highly applicable to optical materials and the like. Furthermore, in the present invention, it is possible to polymerize monomers in the monomer-dispersion containing the colloidal crystals having formed therein. Therefore, it is possible to immobilize the colloidal crystals with polymers while sufficiently maintaining the array structure of the colloidal particles formed in the dispersion. Hence, the present inventors estimate that it is possible to easily control the crystal structure (the lattice constant, the crystal type and the like) by causing array structure of the colloidal particles formed in the monomer-dispersion to be altered by changing, for example, the kind and the concentration of the monomers and the colloidal particles.

According to the present invention, it is possible to provide a process for producing colloidal crystals immobilized with a polymer by which colloidal crystals can be immobilized while the array structure of colloidal particles formed in a dispersion is sufficiently maintained, and by which the crystal structure (the lattice constant, the crystal type and the like) of the colloidal crystal can be easily controlled. Furthermore, it is possible to provide colloidal crystals immobilized with a polymer obtained by adopting the process.

DETAILED DESCRIPTION OF THE PREFERRED EMBODIMENTS

The present invention will be described below in detail in line with preferred embodiments.

First, the process for producing colloidal crystals immobilized with a polymer of the present invention will be described. To be more specific, the process for producing colloidal crystals immobilized with a polymer of the present invention is a process comprising:

the step (first step) of preparing a monomer-dispersion in which colloidal crystals having a three-dimensionally ordered array state are formed by adding, to a monomer-containing liquid containing at least one kind of monomers, colloidal particles having an average particle size in a range from 0.01 μm to 10 μm and a degree of monodispersity expressed by a following equation (1) of 20% or below,

[Degree of monodispersity (unit: %)]=([Standard deviation of particle size]/[Average particle size])×100　　(1)

and then by dispersing the colloidal particles so as to arrange the colloidal particles in a three-dimensionally ordered array state at which a reflection spectrum thereof exhibits a reflection peak; and the step (second step) of obtaining the colloidal crystals immobilized with a polymer by polymerizing the monomers in the monomer dispersion.

Now, the monomers and colloidal particles used in the present invention will be described.

Although not particularly limited, the monomer according to the present invention is preferably a hydrophilic monomer which can be dispersed in water, and more preferably a hydrophilic monomer containing a nonionic hydrophilic group other than an ionic functional group, such as acid and base functional groups. Such a nonionic hydrophilic group includes, for example, a hydroxy group, an ethylene glycol group. In the case of a monomer containing an ionic functional group, such as acid and base functional groups, since such a monomer has an impact on the interaction among colloidal particles during the formation of colloidal crystals, the formation of a three-dimensionally ordered array structure tends to be difficult. In addition, a hydrophilic monomer is preferably employed in the present invention. Meanwhile, when a hydrophobic monomer which does not dissolved in water is employed, it is difficult to uniformly disperse colloidal particles since they aggregate due to the hydrophilicity on the surface thereof. Accordingly, it tends to be difficult to form colloidal crystals in the monomer-dispersion.

Furthermore, the hydrophilic monomer is not particularly limited. Well-known hydrophilic monomers can be used accordingly. For example, such hydrophilic polymers include: polyethylene glycol(meta)acrylate, polyethylene glycol di(meta)acrylate, and glycol tri(meta)acrylate, which each have various polyethylene glycol chain lengths; polypropylene glycol(meta)acrylate, polypropylene glycol di(meta)acrylate, and polypropylene glycol tri(meta)acrylate, which each have various polypropylene glycol chain lengths; 2-hydroxyethyl(meta)acrylate; 2-hydroxypropyl (meta)acrylate; acrylamide; and methylene-bis-acrylamide. Among these hydrophilic monomers, it is especially preferable to use: polyethylene glycol(meta)acrylate; polyethylene glycol di(meta)acrylate; polyethylene glycol tri(meta)acrylate; polypropylene glycol(meta)acrylate; polypropylene glycol di(meta)acrylate; and polypropylene glycol tri(meta) acrylate. As these polyethylene glycol acrylate and polypropylene glycol acrylate monomers, various monomers of which the lengths of ethylene chain or propylene glycol chain are different can be used. The hydrophilicity of these monomers can be controlled by changing the chain length; thus, it tend to be able to control the array state of the colloidal particles more efficiently. These hydrophilic monomers may be used alone or in mixture of two or more kinds. It should be noted that the monomer-containing liquid according to the present invention is not particularly limited as long as it contains at least one kind of the above-listed monomers. Accordingly, the monomer-containing liquid may contain one or more of the above monomers alone, or one or more of the above monomers and a solvent.

The colloidal particles of the present invention are particles having an average particle size in a range from 0.01 μm to 10 μm (more preferably in a range from 0.05 μm to 1.0 μm). In the case of particles having an average size below the lower limit, since the coagulation force among particle surfaces is increased, it tends to be difficult to uniformly disperse the particles in the monomer-dispersion. On the other hand, in the case of particles having an average size above the upper limit, the particles come to settle out more easily, it tends to be difficult to uniformly disperse the particles in the monomer-dispersion.

In addition, the colloidal particles according to the present invention are particles having a degree of monodispersity expressed by the following Equation (1) of 20% or below.

[Degree of monodispersity (unit: %)]=([Standard deviation of particle size]/[Average particle size])×100　　(1)

In other words, the particles are particles having the highly uniform particle size with such a degree of monodispersity. In the present invention, since the particles having such a significantly highly monodispersity is used as the colloidal particles, a three-dimensionally ordered array structure can be easily formed due to the interaction among particles when the colloidal particles are dispersed in a monomer-containing liquid. In addition, such particles having a smaller degree of monodispersity tend to be obtained the characteristics more significantly; thus, it is preferable that the degree of monodispersity be 10% or below.

The material for the colloidal particles is not particularly limited. According to the field to which obtained colloidal crystals are applied, any material selected from well-known organic materials, inorganic materials, organic-inorganic composite materials, and inorganic-inorganic composite materials may be used accordingly. Such organic materials include, for example, polystyrene and its derivatives, and organic polymers, such as acrylic resins. The inorganic materials include, for example, silica (silicon dioxide), alumina (aluminum oxide), titania (titanium oxide), and zinc oxide. The organic-inorganic composite materials include, for example, a core-shell type organic-inorganic composite particle prepared by coating a particle made of polystyrene, its derivatives, acrylic resins or the like with titanium oxide, cerium oxide, zinc oxide or the like. The inorganic-inorganic composite materials include, for example, a core-shell type inorganic-inorganic composite particle preparedly coating a particle made of silica with titanium oxide, cerium oxide, zinc oxide or the like. Furthermore, silica, polystyrene, and methyl polymethacrylate are especially preferably used as the material for the particles, since it is easy to synthesize a monodispersed particles with these materials. As for the colloidal particles, a polystyrene particles and a methyl polymethacrylate particles each synthesized in emulsion polymerization (manufactured by: The Dow Chemical Company; Polyscience, Inc.; Japan Synthetic Rubber Co., Ltd; Sekisui Chemical Co., Ltd; and others) and a silica particles synthesized by the Stober method (manufactured by: Nippon Shokubai Co., Ltd; Catalysts & Chemicals Ind. Co., Ltd; and others) can be used accordingly. The colloidal particle according to the present invention may also be a bilayer structured particle or a hollow particle prepared by coating a monodispersed particle (template particle) with a layered compound according to a Layer-by-Layer method.

In the following section, individual steps will be described.

In the present invention, the first step is a step of preparing a monomer-dispersion in which colloidal crystals having a three-dimensionally ordered array state are formed by adding the colloidal particles to a monomer-containing liquid containing at least one kind of monomers, and then by dispersing the colloidal particles so as to arrange the colloidal particles in a three-dimensionally ordered array state at which a reflection spectrum thereof exhibits a reflection peak.

A content of the colloidal particles in the monomer-dispersion is preferably in a range from 5 vol % to 50 vol %, and more preferably in a range from 10 vol % to 40 vol %. When the content of the colloidal particles is below the lower limit, it tends to be difficult to disperse the colloidal particles in the monomers so as to arrange the colloidal particles in a three-dimensionally ordered array. On the other hand, when the content is above the upper limit, the concentration of the colloidal particles is too high and, therefore it tends to be difficult to control an array structure to be formed.

In the first step, the colloidal particles are dispersed in the monomer-containing liquid so as to be arranged in the three-dimensionally ordered array state at which the reflection spectrum thereof exhibits a reflection peak. In other words, in this step, the colloidal particles are arranged in a three-dimensionally ordered array state at which the reflection spectrum thereof exhibits a reflection peak, by causing the colloidal particles to be dispersed in the monomer-containing liquid. Accordingly, in such a step, the colloidal particles can be efficiently arranged in the three-dimensionally ordered array state by sufficiently preventing the dispersiveness of the colloidal particles from being lowered due to the viscosity of the monomer-containing liquid and by acting a sufficient level of interactions among the colloidal particles. For this reason, it is preferable to maintain the viscosity of the monomer-containing liquid low. It is more preferable that the viscosity of the monomer-containing liquid be 50 mPa·s or below (further preferably in a range from 5 mPa·s to 50 mPa·s). Among various methods for measuring the viscosity of the monomer-containing liquid, such as using a rotational viscometer, a capillary viscometer, and a falling viscometer, a measuring method of using a rheometer "ARES" manufactured by Rheometrics Scientific Inc as the rotational viscometer employing a cylinder or a cone plate is adopted in the present invention.

There are several methods for adjusting the viscosity of the monomer-containing liquid to be in the above-described range, and such methods include, for example: a method in which a monomer having a low viscosity is used; a method in which, in the case where at least 2 kinds of monomers are used, at least one kind of monomers having a lower viscosity is added to the monomer-containing liquid so that the viscosity of the whole monomer-containing liquid can be reduced; and a method in which a solvent is mixed so that the viscosity of the monomer-containing liquid can be reduced. Such a monomer having a low viscosity is not particularly limited. The monomer having a low viscosity can be used by selecting monomer having a lower viscosity from the above-listed hydrophilic monomers according to the kind of other monomer used. The solvent is not particularly limited, and any hydrophilic solvent, such as alcohol, can be used accordingly. In the case where the monomer-dispersion contains a solvent, from viewpoint of preventing the crystal structure from altering due to evaporation of the solvent in the process of immobilization, it is preferable that the content of solvent be 30 wt % or below.

Furthermore, in the present invention, it is possible to properly control the array state of the colloidal particles by selecting appropriate kinds and concentrations of the monomers and the colloidal particles Accordingly, it is easy to adjust the crystal structure. In addition, in the present invention, the colloidal particles which have been arranged to be in the three-dimensionally ordered array state in the monomers can be applied to or injected into various substrates and the like. In this way, the colloidal particles can be immobilized while the array state thereof is sufficiently maintained; thus, the process of the present invention can be easily applied to methods for producing brilliant materials and the like.

The term "a three-dimensionally ordered array state at which a reflection spectrum exhibits a reflection peak" which has been described in the present invention refers to a state at which the presence of a reflection peak due to Bragg diffraction can be confirmed when a reflection spectrum is measured. The term "reflection peak" refers to an inflection point when the intensity of a reflected light increases and decreases with respect to a non-reflecting state in accordance with a change in wavelength. Accordingly, the "reflection peak" is different from a noise which has a fluctuating reflection light intensity. Although such a reflection spectrum can be measured by employing a methods of using a standard spectrophotometer, in the present invention, a method of using "multichannel spectrophotometer Fastevert series" manufactured by Soma Optics to measure wave length ranges from 350 nm to 1050 nm (Fastevert S-2650) and from 900 nm to 1600 nm (Fastevert S-2710). The three-dimensionally ordered array structure may be, for example, a face-centered structure or a body-centered structure.

In colloidal particles in such a three-dimensionally ordered array state, an average distance between nearest neighbor particles can be changed as needed accordingly depending on the intended use. Although not particularly limited, the average distance is preferably in a range from 0.01 times to 10 times an average particle size of colloidal particles, and more preferably in a range from 0.05 times to 2 times. In the case where such an average distance between nearest neighbor particles is below the lower limit, the volume of the polymer matrix is reduced; thus, the strength thereof tends to be reduced. On the other hand, in the case where the average distance is above the upper limit, it tends to be difficult to arrange colloidal particles in a three-dimensionally ordered array state.

Regarding a process for dispersing colloidal particles in hydrophilic monomers so as to arrange the colloidal particles in a three-dimensionally ordered array state at which the reflection spectrum thereof exhibits a reflection peak (hereinafter, simply referred to as "dispersing method"), any method can be adopted as long as the colloidal particles can be dispersed in the three-dimensionally ordered array state by using the method, and are not particularly limited. For example, a method for applying ultrasound for an extended period of time, a method for stirring for an extended period of time, a method for heating, or a method for dispersing by adding a solvent such as alcohol, may be adopted accordingly. In these dispersing methods, in order to arrange colloidal particles in the three-dimensionally ordered array state, a method may be adopted in which a dispersing process is repeated while measuring a reflection spectrum at predetermined intervals until a reflection peak is observed.

In the case of adopting the method for applying ultrasound as the dispersing method, the time of ultrasound application should vary depending on the kind of monomers used, the viscosity of the monomer-dispersion, the concentration of the colloidal particles and the like. However, in order to more securely arrange the colloidal particles in the three-dimensionally ordered array state, the time of ultrasound application is preferably in a range from 0.5 hours to 24 hours (more preferably in a range from 1 hour to 10 hours) when the viscosity of the monomer-containing liquid is in a range from 5 mPa·s to 50 mPa·s and the concentration of the colloidal particles in the monomer-dispersion is in a range from 5 volt to 50 vol %. In the case where the time of ultrasound application is shorter than the lower limit, it tends to be difficult to arrange the colloidal particles in a three-dimensionally ordered array state. On the other hand, in the case where the time is above the upper limit, the uniformly dispersion tends not to be obtained, since the monomer is polymerized.

Although not particularly limited, the frequency of the ultrasound should be 16 kHz or above, and is preferably in a range from 20 kHz to 200 kHz. In the case where the frequency is below the lower limit, it tends to be difficult to arrange the colloidal particles in a three-dimensionally ordered array state. On the other hand, in the case where the frequency is above the upper limit, the colloidal particles come to aggregate easily, and, therefore, it tends to be difficult to arrange the colloidal particles in a three-dimensionally ordered array state.

Although not particularly limited, a temperature condition during the ultrasound application is preferably in a range from 0° C. to 80° C. (more preferably in a range from 10° C. to 60° C.). In the case where a temperature condition is below the lower limit, the dispersion efficiency of the colloidal particles tends to be decreased. On the other hand, a temperature condition is above the upper limit, aggregation among the colloidal particles is promoted; therefore, the colloidal particles tend not to uniformly disperse.

Furthermore, in the case of adopting the method for dispersing by adding a solvent such as alcohol as the dispersing method, in order to more securely arrange the colloidal particles in the three-dimensionally ordered array state, it is preferable that the solvent be methanol, ethanol, propanol, butanol and the like. The content of the solvent is preferably 30 mass parts or less to 100 mass parts of a mixture containing the colloidal particles in hydrophilic monomers. In the case where the content of the solvent is above the upper limit, it is tend to obtain a gel containing the solvent when monomers are polymerized to obtain polymers.

In the present invention, by dispersing the colloidal particles as described above, there are obtained a monomer-dispersion including colloidal crystals formed in a three-dimensionally ordered array state at which the reflection spectrum thereof exhibits a reflection peak. Such a monomer-dispersion can be, for example, applied to or injected into various substrates and the like while the colloidal crystal state in the dispersion is being maintained. For this reason, it is preferable that the present invention further include a step for applying the monomer-dispersion to a substrate or for injecting the monomer-dispersion into a cell after the monomer-dispersion is obtained. The substrate and the cell are not particularly limited, and any well-known substrates and cells may be used accordingly depending on the intended use thereof. In the cases of adding a solvent in order to adjust the viscosity of the monomer-containing liquid and of adopting the above-described dispersing method for adding a solvent, it is preferable that a step for removing the solvent is included between the first step of obtaining the monomer and a second step, which will be described later. This is because the crystal structure is to be prevented from collapsing due to the evaporation of the solvent during the immobilization.

In the present invention, the next step is a step of obtaining the colloidal crystals immobilized with a polymer by polymerizing the monomers in the monomer-dispersion (second step).

In the second step, a method for polymerizing the hydrophilic monomers in the monomer-dispersion is not particularly limited. Any well-known method may be adopted accordingly in which the monomers can be polymerized without losing the crystal structure formed in the monomer-dispersion. For example, such a method may be based on photopolymerization or polymerization by heating. In the case where the monomers are polymerized by heating, it is preferable that a temperature condition for polymerization be approximately 80° C. or below. This is because the crystal structure is to be prevented from disappearing due to the heat.

In a method based on photopolymerization, compared to other methods for polymerizing monomers, the monomers can be more efficiently polymerized without involving application of heat while more sufficiently maintaining the three-dimensionally ordered array structure of the colloidal particles. Therefore, it is preferable to adopt the method based on photopolymerization in which a photopolymerization initiator is further added to the monomer-dispersion, and then the monomer-dispersion is irradiated with a light to polymerize the monomers.

The photopolymerization initiator used for the photopolymerization is not particularly limited. Any well-known photopolymerization initiators may be used. Such photopolymerization initiators include, for example: carbonyl compounds, such as benzoin ether, benzophenone, anthraquinone, thioxane, ketal, and acetophenone; sulfur compounds, such as disulfide, and dithiocarbamate; organic peroxides, such as benzoyl peroxide; azo compounds; transition metal complexes; polysilane compounds; dye sensitizing agents; and the like.

Although the amount of the photopolymerization initiator to be added is not particularly limited, and can be changed accordingly depending on, for example, the kind of the hydrophilic monomers used in the monomer-dispersion, the amount is preferably in a range from 1 mass part to 5 mass parts to 100 mass parts of hydrophilic monomers in the monomer-dispersion. In this photopolymerization, in order to polymerize the monomers while sufficiently maintaining the three-dimensionally ordered array structure of the colloidal particles in the colloidal crystal, it is preferable that the polymerization take place in an approximate range from 0 to 40° C.

In the following section, a colloidal crystals immobilized with a polymer of the present invention will be described. The colloidal crystals immobilized with a polymer of the present invention is obtained by adopting the process for producing colloidal crystals immobilized with a polymer of the present invention described above.

Since the colloidal crystals immobilized with a polymer can be obtained by adopting the process for producing colloidal crystals immobilized with a polymer of the present invention described above, the colloidal crystals immobilized with a polymer is produced while any change in the crystal structure of the colloidal crystal formed in the monomer-dispersion is sufficiently prevented. Moreover, the monomer-dispersion can be applied to or used for coating over various substrates, such as steel plates and glass plates, and various materials, such as paper and fibers, and can be injected into molds and cells. Accordingly, obtained by immobilizing the monomers, the colloidal crystals immobilized with a polymer of the present invention can be applied to various purposes. For example, the colloidal crystals immobilized with a polymer of the present invention can be preferably used as a structural color material exhibiting so-called structural color, such as iridescence (iris color). The colloidal crystals immobilized with a polymer of the present invention can also be preferably used as a coating or a film for an infrared reflective film and a ultra-violet reflective film, and further used preferably as an optical filter impermeable to a light having a certain wavelength, a mirror reflecting a certain light, an optically functional material called photonic crystal, an optical switch, an optical sensor and the like. Furthermore, the colloidal crystals immobilized with a polymer can be obtained as a bulk material after immobilization in a mold or cell as a result of injection therein.

EXAMPLE

In the following section, the present invention will be described more concretely on the basis of Examples and Comparative Examples. However, the present invention is not limited to Examples which will be described in the following section.

Example 1

First, silica particles ("Seahoster KEP30" manufactured by Nippon Shokubai Co., Ltd.; $SiO_2$; particle size 280 nm; degree of monodispersity 10%) were added to polyethylene glycol diacrylate monomers ("NK ESTER A200" manufactured by Shin-Nakamura Chemical Co., Ltd; viscosity 25 mPa·s) to obtain a mixture containing the silica particles of 25 vol %. Then, ultrasound (40 kHz) was applied to the mixture at room temperature (25° C.) for 3 hours to disperse the silica particles so as to arrange the silica particles in a three-dimensionally ordered array state at which the reflection spectrum thereof exhibits a reflection peak. As a result, a monomer-dispersion containing colloidal particles (silica particles) uniformly dispersing in the monomers was obtained.

Next, the monomer-dispersion was mixed with a light curing agent of 2 mass % ("Darocure 1173" manufactured by Ciba Specialty Chemicals K. K.), and then injected into a glass cell (size: 100 mm long, 100 mm wide, and 0.5 mm thick) Then, the resultant mixture in the glass cell was irradiated with an ultraviolet light at room temperature (25° C.) for 10 minutes to cause the polymerization of the monomers. As a result, colloidal crystals immobilized with a polymer was obtained.

Example 2

First, silica particles ("Seahoster KEP30" manufactured by Nippon Shokubai Co., Ltd.; $SiO_2$; particle size 280 nm; degree of monodispersity 10%) were added to polyethylene glycol acrylate monomers ("NK ESTER AM90G" manufactured by Shin-Nakamura Chemical Corporation; viscosity 25 mPa·s) to obtain a mixture containing the silica particles of 25 vol %. Then, ultrasound (40 kHz) was applied to the mixture at room temperature (25° C.) for 3 hours to disperse the silica particles so as to arrange the silica particles in a three-dimensionally ordered array state at which the reflection spectrum thereof exhibits a reflection peak. As a result, a monomer-dispersion containing colloidal particles (silica particles) uniformly dispersing in the monomers was obtained.

Next, the monomer-dispersion was mixed with a light curing agent of 2 mass % ("Darocure 1173" manufactured by Ciba Specialty Chemicals K. K.), and then injected into a glass cell (size: 100 mm long, 100 mm wide, and 0.5 mm thick) Then, the resultant mixture in the glass cell was irradiated with an ultraviolet light at room temperature (25° C.) for 10 minutes to cause the polymerization of the monomers. As a result, colloidal crystals immobilized with a polymer was obtained.

Example 3

After ethanol was added to polypropylene glycol triacrylate monomers ("NK ESTER APG700" manufactured by Shin-Nakamura Chemical Corporation) to obtain a mixture having a viscosity of 40 mPa·s, silica particles ("Seahoster KEP30" manufactured by Nippon Shokubai Co., Ltd.; $SiO_2$; particle size 280 nm; degree of monodispersity 10%) were added to obtain a mixture containing the silica particles of 25 vol %. Then, ultrasound (40 kHz) was applied to the mixture at room temperature (25° C.) for 3 hours to disperse the silica particles so as to arrange the silica particles in a three-dimensionally ordered array state at which the reflection spectrum thereof exhibits a reflection peak. As a result, a monomer-dispersion containing colloidal particles (silica particles) uniformly dispersing in the monomers was obtained. It should be noted that, in this monomer-dispersion, the content of the ethanol was 10 mass parts to 100 mass parts of a total amount of the monomers and silica particles.

Next, the monomer-dispersion was mixed with a light curing agent of 2 mass % ("Darocure 1173" manufactured by Ciba Specialty Chemicals K. K.), and then injected into a glass cell (size: 100 mm long, 100 mm wide, and 0.5 mm thick) Then, the resultant mixture in the glass cell was irradiated with an ultraviolet light at room temperature (25° C.) for 10 minutes to cause the polymerization of the monomers. As a result, colloidal crystals immobilized with a polymer was obtained.

Example 4

By adopting the same process as that in Example 1 except for that the content of the silica particles was 15 vol %, a monomer-dispersion and colloidal crystals immobilized with a polymer obtained by immobilizing the monomer-dispersion were prepared.

Example 5

By adopting the same process as that in Example 2 except for that the content of the silica particles was 15 vol %, a monomer-dispersion and colloidal crystals immobilized with a polymer obtained by immobilizing the monomer-dispersion were prepared.

Example 6

By adopting the same process as that in Example 3 except for that the content of the silica particles was 15 vol %, a monomer-dispersion and colloidal crystals immobilized with a polymer obtained by immobilizing the monomer-dispersion were prepared.

[Measurement of the Reflection Spectrum of a Monomer-Dispersion and a Colloidal Crystals Immobilized with a Polymer]

Reflection spectra of monomer-dispersions and colloidal crystals immobilized with a polymer obtained in Examples 1 to 6 were measured by using a multi-channel spectrophotometer "Fastevert" manufactured by Soma Optics. A graph showing reflection spectra of monomer-dispersions respectively obtained in Example 1 to 3 is presented in FIG. 1, and a graph showing reflection spectra of colloidal crystals immobilized with a polymer respectively obtained in Examples 1 to 3 is presented in FIG. 2. A graph showing reflection spectra of monomer-dispersions respectively obtained in Example 4 to 6 is presented in FIG. 3, and a graph showing reflection spectra of colloidal crystals immobilized with a polymer respectively obtained in Examples 4 to 6 is presented in FIG. 4.

Figure 1:
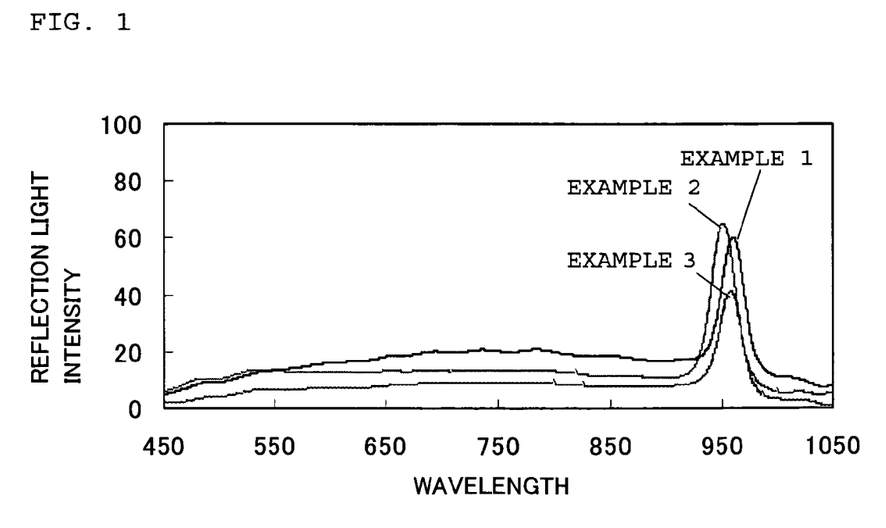
FIG. 1 is a graph showing reflection spectra of monomer-dispersions respectively obtained in Examples 1 to 3.
Figure 2:
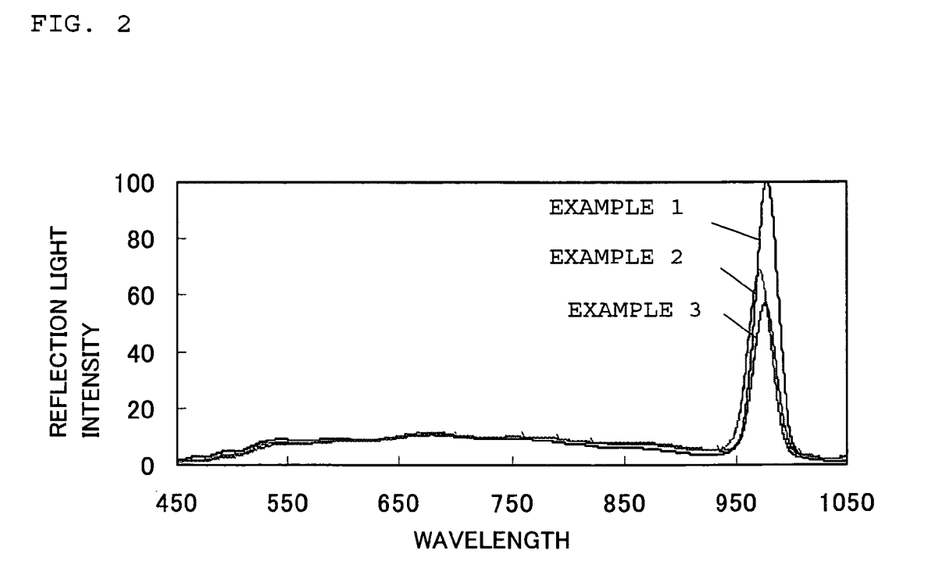
FIG. 2 is a graph showing reflection spectra of immobilized colloidal crystals respectively obtained in Examples 1 to 3.

As clearly shown in FIG. 1, a reflection peak was observed in all the reflection spectra of the monomer-dispersions respectively obtained in Example 1 to 3; thus, it was confirmed that colloidal crystals were formed in the monomer-dispersions. Likewise, as clearly shown in FIG. 2, a reflection peak was observed in all the reflection spectra of the colloidal crystals immobilized with a polymer respectively obtained in Examples 1 to 3; thus, it was confirmed that the colloidal crystals were immobilized by the polymers. Furthermore, as the results shown in FIGS. 1 and 2 clearly indicate, the following was confirmed. In the process for producing colloidal crystals immobilized with a polymer of the present invention, it is possible to immobilize the colloidal crystals while sufficiently maintaining the array structure of the colloidal particles formed in the monomer-dispersions.

Figure 3:
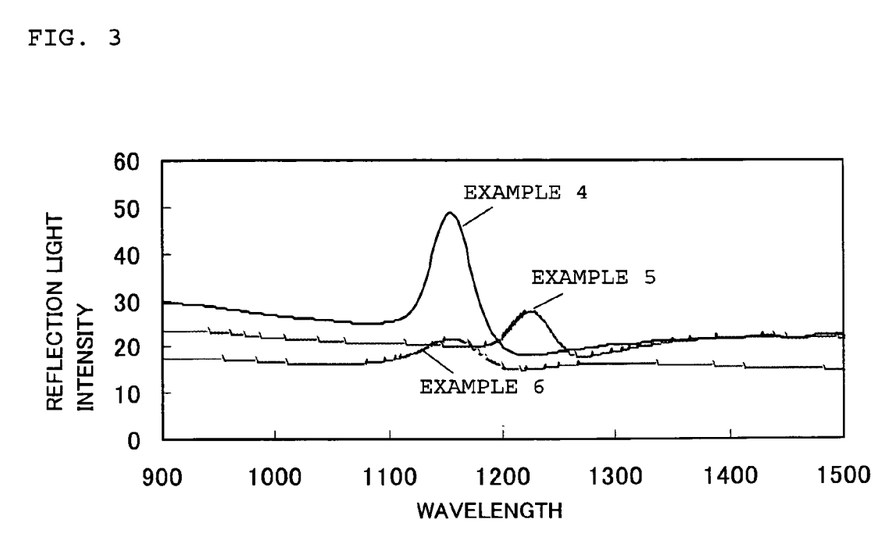
FIG. 3 is a graph showing reflection spectra of monomer-dispersions respectively obtained in Examples 4 to 6.
Figure 4:
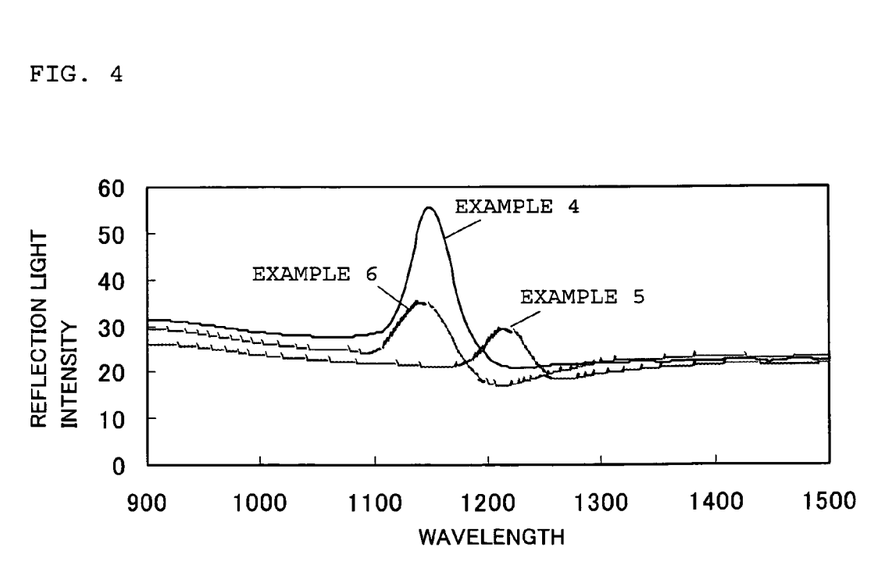
FIG. 4 is a graph showing reflection spectra of immobilized colloidal crystals respectively obtained in Examples 4 to 6.

As clearly shown in FIG. 3, a reflection peak was observed in all the reflection spectra of the monomer-dispersions respectively obtained in Example 4 to 6; thus, it was confirmed that colloidal crystals were formed in the monomer-dispersions. Likewise, as clearly shown in FIG. 4, a reflection peak was observed in all the reflection spectra of the colloidal crystals immobilized with a polymer respectively obtained in Examples 4 to 6; thus, it was confirmed that the colloidal crystals were immobilized by the polymers. Furthermore, as the results shown in FIGS. 2 and 4 clearly indicate, in the comparison between corresponding Examples having the same condition except for the contents of silica particles, it was confirmed that the reflection peak was shifted toward a longer wavelength in the colloidal crystals immobilized with a polymer respectively obtained in Examples 4 to 6 in which the content of the silica particles was lower. Based on these results, it was revealed that, in the present invention, the distance among colloidal particles can be controlled by changing the concentration of the colloidal particles added to the monomers, and thereby to easily adjust the periodic structure.

Comparative Example 1

Figure 5:
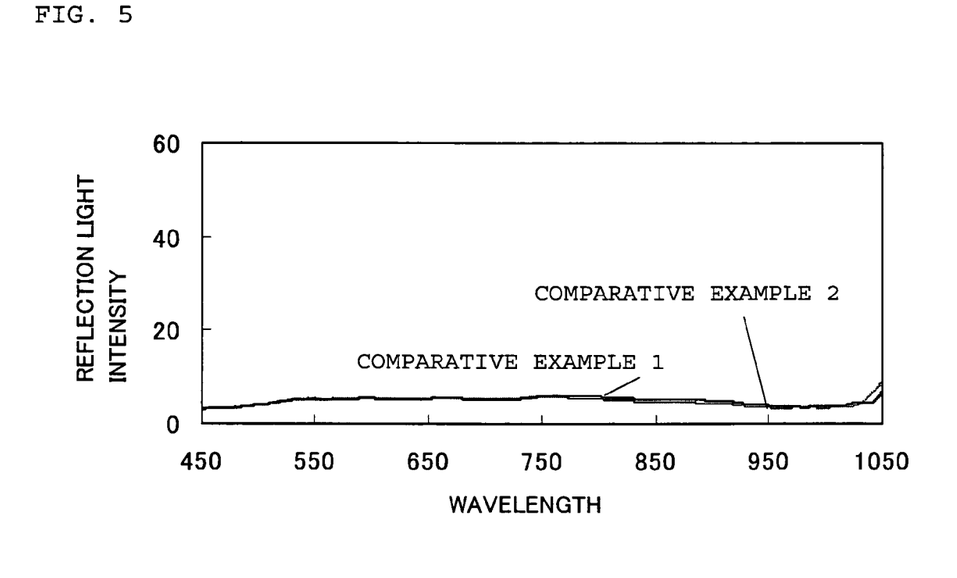
FIG. 5 is a graph showing reflection spectra of dispersions respectively obtained in Comparative Examples 1 and 2.

Silica particles ("Seahoster KEP30" manufactured by Nippon Shokubai Co., Ltd.; $SiO_2$; particle size 280 nm; degree of monodispersity 10%) were added to polyethylene glycol diacrylate monomers ("NK ESTER A200" manufactured by Shin-Nakamura Chemical Corporation; viscosity 25 mPa·s) to obtain a mixture containing the silica particles of 25 vol % in the monomers. Then, the mixture was manually stirred by use of a spatula for approximately 30 minutes to obtain a dispersion containing the silica particles dispersing therein. The reflection spectrum of the dispersion thus obtained was measured. As clearly observed in the reflection spectrum shown in FIG. 5, no reflection peak was obtained. Thus, it was confirmed that no colloidal crystal was formed. Next, the dispersion was mixed with a light curing agent "Darocure 1173," injected into a glass cell, and then irradiated with an ultraviolet light for 10 minutes for polymerization of the monomers. However, as expected, no colloidal crystal was obtained.

Comparative Example 2

Silica particles ("Seahoster KEP30" manufactured by Nippon Shokubai Co., Ltd.; $SiO_2$; particle size 280 nm; degree of monodispersity 10%) were added to polyethylene glycol diacrylate monomers ("NK ESTER A200" manufactured by Shin-Nakamura Chemical Corporation; viscosity 25 mPa·s) to obtain a mixture containing the silica particles of 3 vol % in the monomers. Then, ultrasound (40 kHz) was applied to the mixture at room temperature (25° C.) for 3 hours to obtain a dispersion containing the silica particles dispersing therein. The reflection spectrum of the dispersion thus obtained was measured. As clearly observed in the reflection spectrum shown in FIG. 5, no reflection peak was observed. Thus, it was confirmed that no colloidal crystal was formed.

Next, the dispersion was mixed with a light curing agent "Darocure 1173," injected into a glass cell, and then irradiated with an ultraviolet light for 10 minutes for polymerization of the monomers. However, as expected, no colloidal crystal was obtained.

Comparative Example 3

Silica particles ("Seahoster KEP30" manufactured by Nippon Shokubai Co., Ltd.; $SiO_2$; particle size 280 nm; degree of monodispersity 10%.) were added to polyethylene glycol diacrylate monomers ("NK ESTER A200" manufactured by Shin-Nakamura Chemical Corporation; viscosity 25 mPa·s) to obtain a mixture containing the silica particles of 55 vol % in the monomers. Then, ultrasound (40 kHz) was applied to the mixture at room temperature (25° C.) for 3 hours to obtain a dispersion. In the dispersion thus obtained, dispersion of the silica particles was hardly observed. Thus, the reflection spectrum of the dispersion could not be evaluated.

Next, the dispersion was mixed with a light curing agent "Darocure 1173," injected into a glass cell, and then irradiated with an ultraviolet light for 10 minutes for polymerization of the monomers. However, as expected, no colloidal crystal was obtained.

Comparative Example 4

Figure 6:
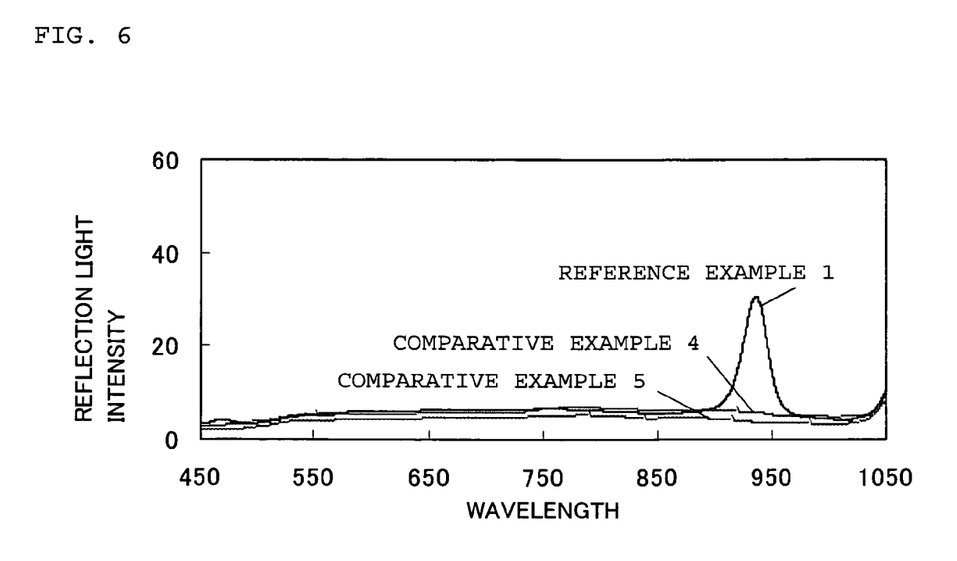
FIG. 6 is a graph showing reflection spectra of dispersions respectively obtained in Comparative Examples 4 to 5 and Reference Example 1.

Silica particles ("Seahoster KEP30" manufactured by Nippon Shokubai Co., Ltd.; $SiO_2$; particle size 280 nm; degree of monodispersity 10%) were added to polypropylene glycol diacrylate monomers ("NK ESTER APG700" manufactured by Shin-Nakamura Chemical Corporation; viscosity 70 mPa·s) to obtain a mixture containing the silica particles of 25 vol %. Then, ultrasound (40 kHz) was applied to the mixture at room temperature (25° C.) for 3 hours to obtain a dispersion. In the dispersion thus obtained, although a part of the silica particles dispersed, no uniformly dispersion of the silica particles was observed. The reflection spectrum of the dispersion was measured, and, as clearly observed in the graph shown in FIG. 6, no reflection peak was observed. Thus, it was confirmed that no colloidal crystal was formed in the dispersion.

Next, the dispersion was mixed with a light curing agent "Darocure 1173," injected into a glass cell, and then irradiated with an ultraviolet light for 10 minutes for polymerization of the monomers. However, as expected, no colloidal crystal was obtained.

Comparative Example 5

Silica particles ("Seahoster KEP30" manufactured by Nippon Shokubai Co., Ltd.; $SiO_2$; particle size 280 nm; degree of monodispersity 10%) were added to methyl methacrylate monomers (Wako Pure Chemical Industries, Ltd.) to obtain a mixture containing the silica particles of 25 vol %. Then, ultrasound (40 kHz) was applied to the mixture at room temperature (25° C.) for 3 hours to obtain a dispersion. In the dispersion thus obtained, although a part of the silica particles dispersed, no uniform dispersion of the silica particles was observed. The reflection spectrum of the dispersion was measured, and, as clearly observed in the graph shown in FIG. 6, no reflection peak was observed. Thus, it was confirmed that no colloidal crystal was formed in the dispersion.

Next, the dispersion was mixed with a light curing agent "Darocure 1173," injected into a glass cell, and then irradiated with an ultraviolet light for 10 minutes for polymerization of the monomers. However, as expected, no colloidal crystal was obtained.

Based on the results obtained in Comparative Examples 1 to 5, it was confirmed that it is impossible to obtain a target colloidal crystals immobilized with a polymer unless colloidal particles are dispersed so as to be arranged in a three-dimensionally ordered array state at which the reflection spectrum thereof exhibits a reflection peak.

Reference Example 1

After ethanol was added to polyethylene glycol acrylate monomers ("NK ESTER AM90G" manufactured by Shin-Nakamura Chemical Corporation; viscosity 25 mPa·s) to obtain a mixture having a viscosity of 3 mPa·s, silica particles ("Seahoster KEP30" manufactured by Nippon Shokubai Co., Ltd.; $SiO_2$; particle size 280 nm; degree of monodispersity 10%) were added to the mixture containing the silica particles of 25 vol % in the monomers. Then, ultrasound (40 kHz) was applied to the mixture at room temperature (25° C.) for 3 hours to obtain a monomer-dispersion containing the silica particles dispersing therein. The reflection spectrum of the dispersion thus obtained was measured. As clearly observed in the reflection spectrum shown in FIG. 6, a reflection peak was observed. Thus, formation of colloidal crystals was observed. It should be noted that, in this monomer-dispersion, the content of the ethanol was 10 mass parts to 100 mass parts of a total amount of the monomers and silica particles.

Next, the dispersion was mixed with a light curing agent "Darocure 1173," injected into a glass cell, and then irradiated with an ultraviolet light for 10 minutes for polymerization of the monomers. However, the polymer was not formed firmly because the volume of the solvent was large. Thus, no colloidal crystal immobilized with a polymer was obtained.

As described above, according to the present invention, it is possible to provide a process for producing colloidal crystals immobilized with a polymer. By adopting the process, colloidal crystals can be immobilized while a array structure of colloidal particles formed in a liquid is sufficiently maintained, and, therefore, the crystal structure (the lattice constant, the crystal type and the like) of a colloidal crystals can be easily controlled. The present invention can also provide colloidal crystals immobilized with a polymer obtained by adopting the process.

Hence, the process for producing colloidal crystals immobilized with a polymer of the present invention is particularly useful as a method for producing colloidal crystals which are used for the production of structural color materials, infrared reflective films, ultraviolet reflective films and a light film impermeable to a light having a certain wavelength.

What is claimed is:

1. A process for producing colloidal crystals immobilized with a polymer, comprising the steps of:
    preparing a monomer-dispersion in which colloidal crystals having a three-dimensionally ordered array state are formed by adding, to a monomer-containing liquid containing at least one kind of monomers, colloidal particles having an average particle size in a range from 0.01 μm to 10 μm and a degree of monodispersity expressed by a following equation (1) of 20% or below,

[Degree of monodispersity (unit: %)]=([Standard deviation of particle size]/[Average particle size])×100    (1)

and then by dispersing the colloidal particles so as to arrange the colloidal particles in a three-dimensionally ordered array state at which a reflection spectrum thereof exhibits a reflection peak; and
    obtaining the colloidal crystals immobilized with a polymer by polymerizing the monomers in the monomer-dispersion,
    wherein, in the step of preparing a monomer-dispersion, the colloidal particles are dispersed in the monomer containing liquid by applying ultrasound.

2. The process for producing colloidal crystals immobilized with a polymer according to claim 1, wherein the degree of monodispersity of the colloidal particles is 10% or below.

3. The process for producing colloidal crystals immobilized with a polymer according to claim 1, wherein a viscosity of the monomer-containing liquid is in a range from 5 mPa·s to 50 mPa·s.

4. The process for producing colloidal crystals immobilized with a polymer according to claim 1, wherein a content of the colloidal particles in the monomer-dispersion is in a range from 5 vol % to 50 vol %.

5. The process for producing colloidal crystals immobilized with a polymer according to claim 1, wherein the content of the colloidal particles in the monomer-dispersion is in a range from 10 vol % to 40 vol %.

6. The process for producing colloidal crystals immobilized with a polymer according to claim 1, wherein the monomers are hydrophilic monomers each having a nonionic hydrophilic group.

7. The process for producing colloidal crystals immobilized with a polymer according to claim 1, wherein the monomers are at least one kind of hydrophilic monomers selected from the group consisting of: polyethylene glycol(meta) acrylate; polyethylene glycol di(meta) acrylate; polyethylene glycol tri(meta) acrylate; polypropylene glycol(meta) acrylate; polypropylene glycol di(meta) acrylate; and polypropylene glycol tri(meta) acrylate.

8. The process for producing colloidal crystals immobilized with a polymer according to claim 1, wherein the colloidal particles are particles each made of any one selected from the group consisting of silica, polystyrene and methyl polymethacrylate.

9. The process for producing colloidal crystals immobilized with a polymer according to claim 1, wherein the average particle size of the colloidal particles is in a range from 0.05 μm to 1.0 μm.

10. The process for producing colloidal crystals immobilized with a polymer according to claim 1, wherein, in the step of preparing a monomer-dispersion, the colloidal particles are dispersed in the monomer containing liquid by applying ultrasound having a frequency in a range from 20 kHz to 200 kHz for 0.5 hours to 24 hours.

11. Colloidal crystals immobilized with a polymer obtained by the process for producing colloidal crystals immobilized with a polymer according to claim 1.

\* \* \* \* \*